United States Patent Office 2,848,785
Patented Aug. 26, 1958

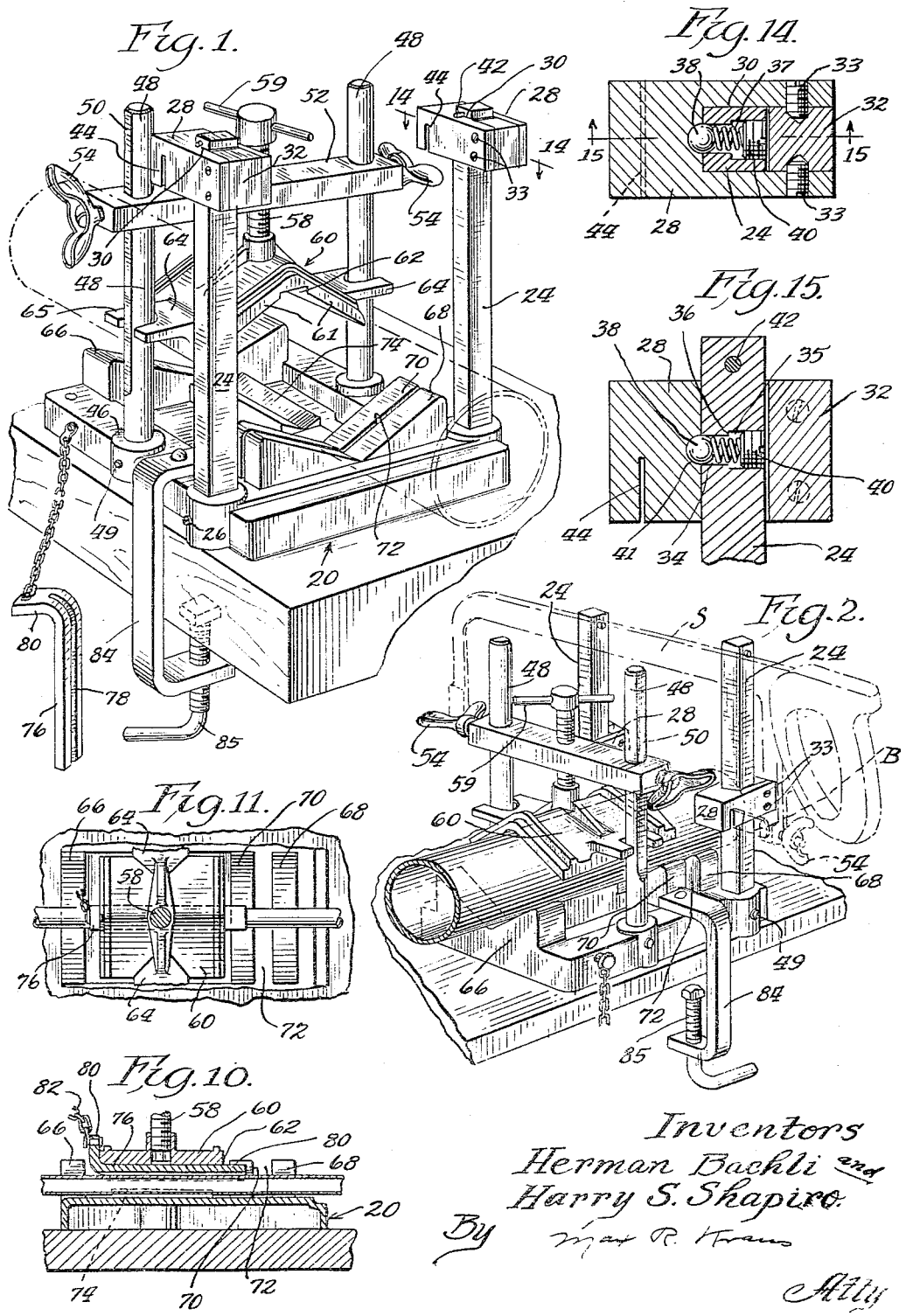

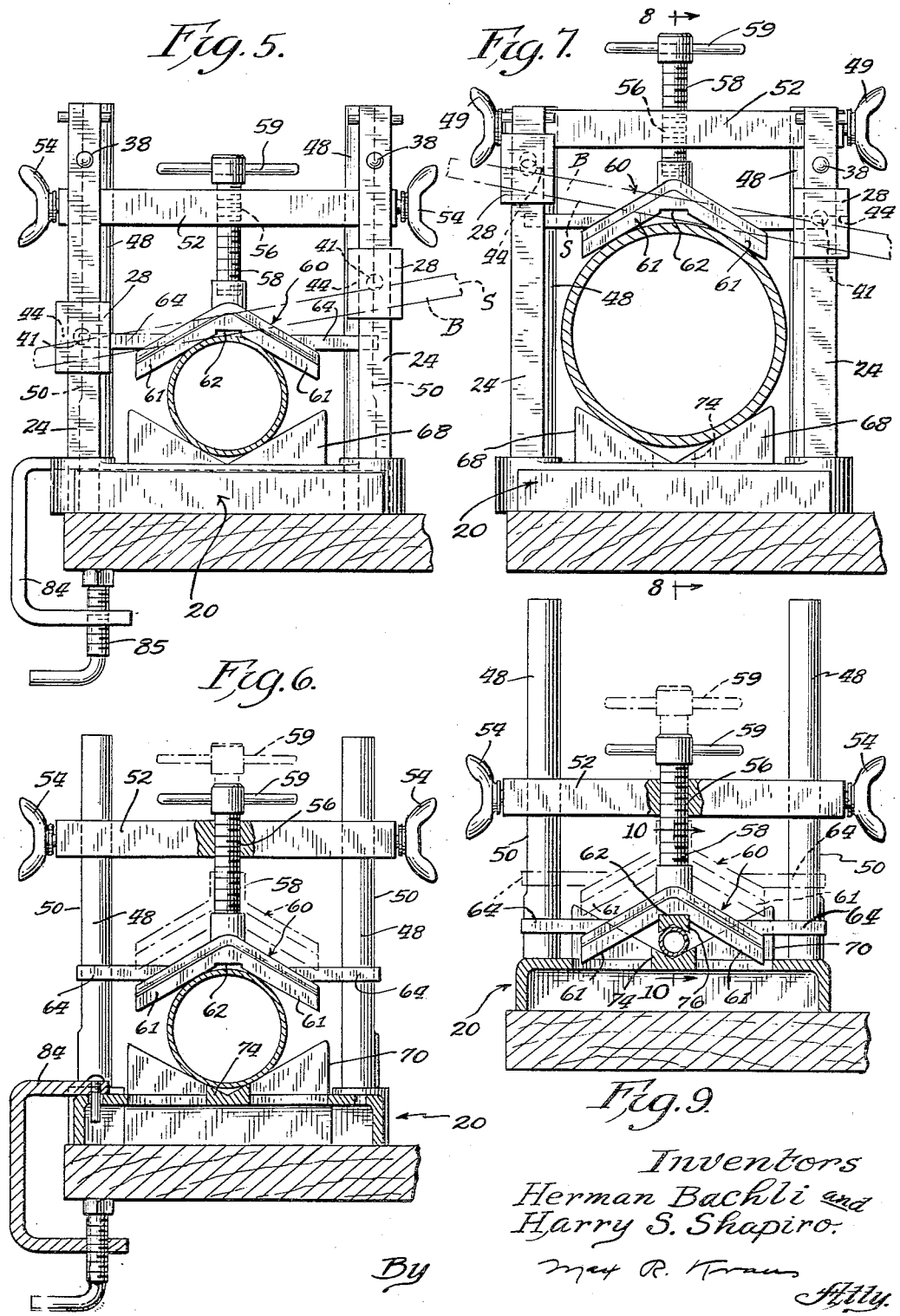

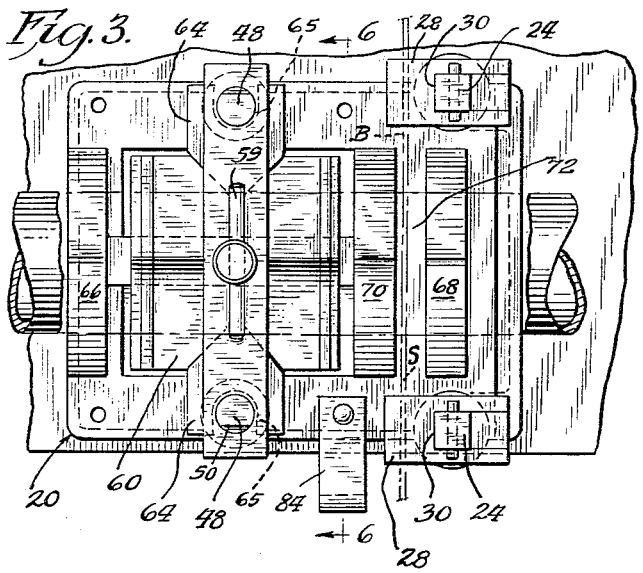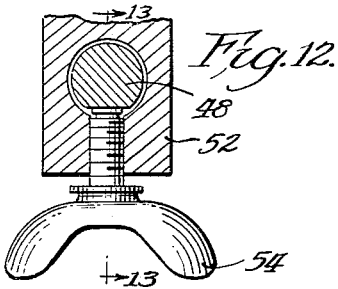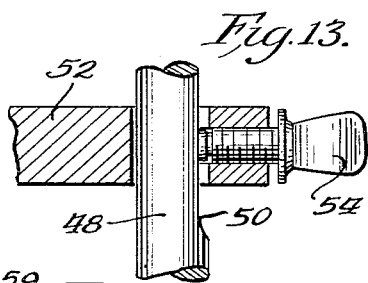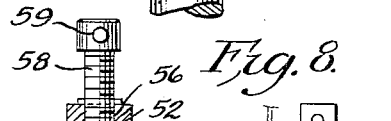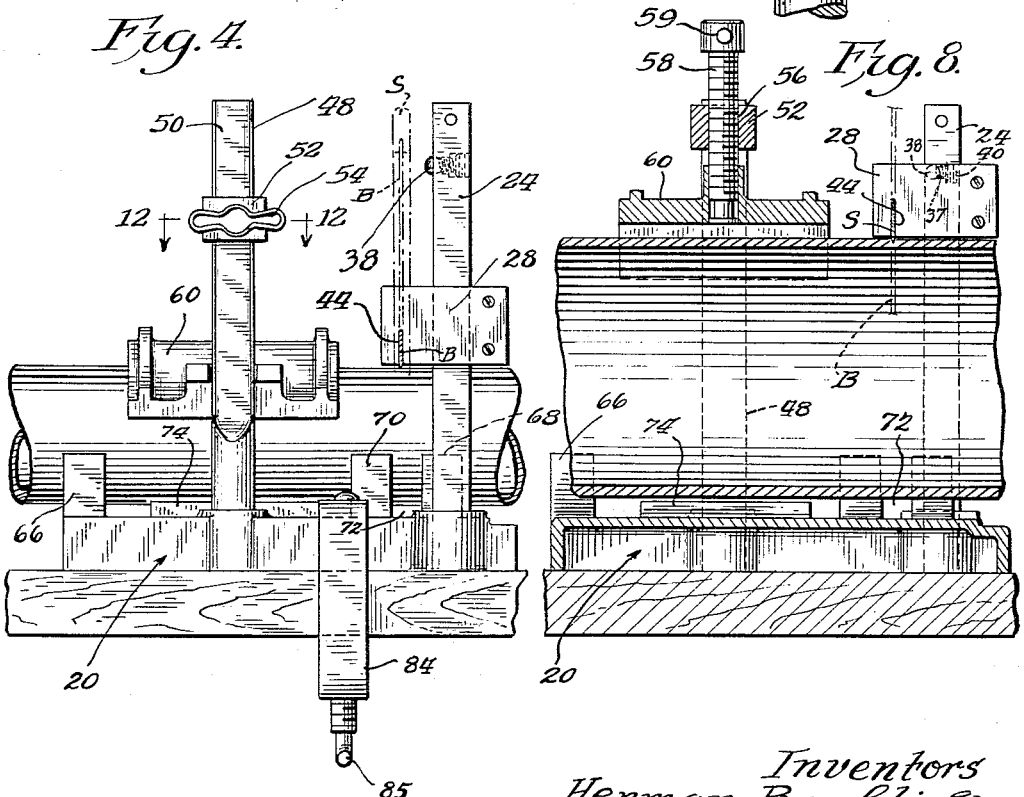

2,848,785
DEVICE FOR USE IN CLAMPING AND CUTTING TUBING

Herman Bachli and Harry S. Shapiro, Chicago, Ill., assignors to Chicago Specialty Manufacturing Co., Chicago, Ill., a corporation of Illinois Application May 14, 1956, Serial No. 584,737

4 Claims. (Cl. 29—67)

This invention relates to a device for use in clamping and cutting tubing.

One of the objects of this invention is to provide a device which is used for clamping and holding tubing in position for cutting same and to provide means for guiding the saw to cut the tubular member.

Another object is to provide a device of the foregoing character which is adapted for use in connection with tubular members of a large range of different diameters thus it can accommodate tubing from the smallest diameter to the largest diameter that is normally used in connection with plumbing and the like.

Another object is to provide a portable device which is simple and easy to operate, which is comparatively inexpensive to manufacture and which has great utility.

Other objects will become apparent as this description progresses.

In the drawings:

Fig. 1 is a perspective view of the device.

Fig. 2 is a perspective view of the device taken from a different view than Fig. 1 showing a tubing clamped therein.

Fig. 3 is a plan view of Fig. 2.

Fig. 4 is a side view.

Fig. 5 is an end view of Fig. 2.

Fig. 6 is an elevational view partly in cross section taken on lines 6—6 of Fig. 3.

Fig. 7 is an end elevational view showing a tubing clamped therein of a diameter larger than a tubing of Fig. 5.

Fig. 8 is a cross sectional view taken on lines 8—8 of Fig. 7.

Fig. 9 is an end view similar to Fig. 6 but showing a tubing clamped therein of a small diameter.

Fig. 10 is a cross sectional view taken on lines 10—10 of Fig. 9.

Fig. 11 is a top plan view showing particularly the upper clamping jaw.

Fig. 12 is a cross sectional view taken on lines 12—12 of Fig. 4.

Fig. 13 is a cross sectional view taken on lines 13—13 of Fig. 12.

Fig. 14 is a cross sectional view taken on lines 14—14 of Fig. 1, and

Fig. 15 is a cross sectional view taken on lines 15—15 of Fig. 14.

The unit includes a base 20 formed preferably of a cast aluminum or the like having a pair of spaced vertical openings or recesses 22 adjacent one end thereof. Secured in each of said openings is a post 24 which is square shaped in transverse section similar to the shape of said openings. The vertical posts 24 are secured in said openings by means of set screws 26. Slidably supported on each of said posts is a saw guide block 28 best shown in Figs. 1, 14 and 15. The saw guide block 28 is of rectangular shape and is provided with a rectangular shaped opening 30 extending from the rear of the block which slidably embraces the square post 24. A block 32 closes the rear of opening 30 and said block is secured to the saw guide block by means of screws 33. The saw guide slidably fits on said vertical posts and is slidable thereon.

Each of the vertical posts 24 is provided adjacent the top thereof, as best shown in Figs. 14 and 15 with a horizontal bore 34 which is enlarged as at 35 to provide a shoulder 36 therewithin. Supported within said bore is a ball bearing 38 engaged by a coil spring 37, the opposite end of which rests against a threaded plug 40 in threaded engagement within the bore 35. The spring 37 normally urges the ball bearing 38 outwardly or to the left, as shown in Figs. 14 and 15 so that the ball bearing extends partially outwardly of said post. However the ball bearing is not dislodged from the bore 34 as the front of the bore is slightly reduced in diameter. The guide block 28 has a semi-spherical shaped recess 41 to receive the exposed portion of the ball bearing 38. When the saw guide block 38 is slid to the top of the post 24, as shown in Figs. 1, 14 and 15, the ball bearing will engage the semi-spherical shaped recess 41 in said saw guide block to lock said saw guide block in position on said posts. Each of the saw guide blocks may be thus locked in position adjacent the top of each post but may be readily released from said locked position by pushing on said block downwardly. The saw guide blocks are thus vertically slidable on said posts and may be releasably locked on said posts adjacent the upper ends of said posts. The upper ends of said posts are each provided with a pin 42 which prevents withdrawal of the guide blocks from said posts. Each of said saw guide blocks 28 is provided with a slot 44 to accommodate the blade of a saw. The two slots 44 are aligned and of such a width that the blade can move freely during the sawing operation. The base 20 is also provided with a pair of vertically disposed bores 46, each of which receives a circular post 48 held by a set screw 49. The posts 48 have a flat surface 50 extending along the major portion of their length. Slidably supported on the two posts 48 is a cross bar 52 which supports at its opposite ends a pair of wing screws 54 which engage the flat sides of the posts (Figs. 1, 12 and 13) to lock the bar at any desired position. The cross bar 52 has a threaded vertical opening 56 centrally thereof which receives a screw member 58 having a handle 59 for rotating the screw member. The screw member 58 has secured to the lower end thereof an upper clamping jaw generally indicated at 60. The screw member 58 is secured to the upper clamping jaw 60 so that the screw member is rotatable with respect to the clamping jaw but is secured against detachment therefrom as best seen in Fig. 8. The upper clamping jaw 60 is generally of inverted V shape having diverging wings or sides 61. A slot 62 extends through the central portion of said jaw for the purpose of receiving an adaptor presently to be described. The upper clamping jaw 60 is provided with laterally extending arms 64 having semi-circular shaped cutouts 65 at their ends to slidably engage the vertical posts 48 to prevent rotation of said upper clamping jaw 60.

The base 20 adjacent one end thereof is provided with a substantially V-shaped supporting block or lower jaw 66 which is formed integrally with the base as a casting. The base 20 is also provided adjacent its opposite end with a pair of similar V-shaped supporting blocks or lower jaws 68 and 70. The lower jaw 68 is positioned between the posts 24 and the jaw 70 is positioned inwardly of jaw 68 and spaced therefrom to provide a space 72 which is in vertical alignment with the slot 44 of the saw guide block 28.

Formed integrally with the base 20 and extending longitudinally between lower jaws 66 and 70 is a V-shaped block or jaw 74 whose upper surfaces are on the same plane as the upper surfaces of jaws 66, 68 and 70 and are in alignment therewith. However, the sides of jaw 74 extend only a short distance as compared to jaws 66, 68 and 70.

For tubes of a diameter ranging from ¼" to 4" the tubes are supported on the lower jaws 66, 68 and 70 to rest thereon, as best shown in Figs. 2, 5, 6 and 7. The cross bar 52 is slidably adjusted on the posts 48 and locked in position by the wing screws 54. The upper clamping jaw is adapted to rest on the top of the tube and the clamping jaw is then adjusted to clamping position by means of the threaded member 58. The saw blade B of the saw S shown in phantom in Fig. 2 is positioned in the aligned slots 44 of the saw guide blocks 28 so as to guide the saw blade during the sawing operation. The saw is thus held positioned over the tube and may be moved in sawing position back and forth across the top of the tube to cut same. For sawing position the guide blocks 28 are disengaged from their secured position at the top of the posts 24 merely by pushing the blocks downwardly to effect disengagement of the ball bearing 38 with the semi-spherical recess in the guide block. The guide blocks are then freely slidable on the posts 24 and as the saw S is moved back and forth across the tube in cutting, the blade B will be positioned in the slots 44 of the guide blocks but the guide blocks will move freely up and down on the posts 24 in conformity with the position of the blade B. The weight of the guide blocks will cause them to rest on the blade and follow vertically the movements of the saw blade. As the cutting progresses the saw blade continues to move downwardly in the space 72 between the two jaws 68 and 70 to effect a complete sawing of the tube.

For tubes having a very small diameter, the tube is positioned to rest, as best shown in Fig. 9 on the intermediate V-shaped block or jaw 74. So that the upper clamping jaw can engage said tube, a rectangular shaped block or adaptor 76 is inserted in the slot 62 of the upper clamping jaw and removably held therein. The adaptor has an inverted V shaped surface 78 engaging the top of the pipe as best shown in Fig. 9. The adaptor 76 has one end bent upwardly as at 80 and is secured by a chain 82 to the base 20. It is inserted in the slot 62 through the rear thereof and may be removed therefrom.

In connection with tubes of the larger diameters, the upper clamping jaw is usually positioned so that the sides or wings thereof are above the inclined plane of the lower clamping jaws, however when a tube of the diameter such as shown in Fig. 9 is inserted, the upper clamping jaw when in adjusted clamping position is positioned so that the lower portion of the wings or sides thereof extend below the upper planes of the lower jaws. Since the upper clamping jaw 60 is positioned between the jaws 66 and 70 it does not interfere with said jaws nor does it engage same. The saw blade is guided in the same manner in the saw guide blocks irrespective of the diameter of the tube to be cut.

The base may be suitably secured to any supporting surface in any desired manner, however we have shown a U-shaped bracket 84 having a threaded adjusting head 85 for said purpose. One of the legs of the bracket engages the base, the other engages the supporting surface.

It will be understood that various changes and modifications may be made from the foregoing without departing from the spirit and scope of the appended claims.

We claim:

1. In a device of the character described comprising a base, a pair of posts supported on said base, a saw blade guide block slidably supported on each said post, each guide block being independently slidable and positioned above the tubing to be cut, a slot in each said saw blade guide block to guide the saw blade, means for automatically and releasably locking each guide block at the upper end of its respective post by positioning said guide block at the upper end of said post, said means comprising a spring biased plunger in one of said members engaging a recess in the other member, a lower jaw positioned on said base to support a tube, a second pair of posts on said base, a cross member slidably supported in said second pair of posts, an upper clamping jaw adjustably supported on said cross member, and means for securing the cross member in adjusted position on said second pair of posts.

2. In a device of the character described comprising a base, a post supported on said base, a saw blade guide block slidably supported on said post and positioned above the tubing to be cut, a slot in said saw blade guide block to guide the saw blade, means for automatically and releasably locking the guide block at the upper end of said post by positioning said guide block at the upper end of said post, a pair of transversely positioned V-shaped lower jaws on said base to support a tube with each of said jaws positioned adjacent the opposite ends of said base, another V-shaped jaw positioned on said base and extending longitudinally between said first mentioned pair of jaws to support a tubing of a smaller diameter than may be supported on said first mentioned pair of jaws, a pair of posts on said base, a cross member slidably supported on said pair of posts, an upper clamping jaw adjustably supported on said cross member, and means for securing the cross member in adjusted position on said pair of posts.

3. In a device of the character described comprising a base, a post supported on said base, a saw blade guide block slidably supported on said post and positioned above the tubing to be cut, a slot in said saw blade guide block to guide the saw blade, means for automatically and releasably locking the guide block at the upper end of said post by positioning said guide block at the upper end of said post, said means comprising a spring biased member supported in said post adapted to engage a recess in said block, a pair of transversely positioned V-shaped lower jaws on said base to support a tube with each of said jaws positioned adjacent the opposite ends of said base, another V-shaped jaw positioned on said base and extending longitudinally between said first mentioned pair of jaws to support a tubing of a smaller diameter than may be supported on said first mentioned pair of jaws, a pair of posts on said base, a cross member slidably supported on said pair of posts, an upper clamping jaw adjustably supported on said cross member, and means for securing the cross member in adjusted positions on said pair of posts, said upper clamping jaw having a slot, and an adaptor removably secured in said slot for engaging a tube of a smaller diameter.

4. In a device of the character described comprising a base, a post positioned on said base, a saw blade guide block slidably supported on said post and positioned above the tubing to be cut, a slot in said saw blade guide block to guide the saw blade, means for automatically and releasably locking the guide block at the upper end of said post by positioning said guide block at the upper end of said post, a pair of transversely positioned V-shaped lower jaws on said base to support tubes of a large diameter, one of each of said pair of lower jaws positioned adjacent the opposite ends of said base, another V-shaped jaw on said base and extending longitudinally between said first mentioned pair of jaws to support a tube of a smaller diameter than capable of being supported on said first mentioned pair of jaws, a pair of posts on said base, a cross member slidably supported on said pair of posts, and an upper clamping jaw adjustably supported on said cross member.

References Cited in the file of this patent

UNITED STATES PATENTS

| | | |
|---|---|---|
| 430,727 | Caleb et al. | June 24, 1890 |
| 2,024,111 | Phillis | Dec. 10, 1935 |
| 2,519,269 | McCrink | Aug. 15, 1950 |
| 2,563,069 | Roberts | Aug. 7, 1951 |
| 2,759,385 | Franck | Aug. 21, 1956 |